(12) United States Patent
Kinoshita

(10) Patent No.: US 8,882,401 B2
(45) Date of Patent: Nov. 11, 2014

(54) DISCHARGE APPARATUS FOR POWDERED OR GRANULAR MATERIAL AND TRANSPORT SYSTEM FOR THE MATERIAL PROVIDED WITH THE DISCHARGE APPARATUS

(75) Inventor: Junya Kinoshita, Hirakata (JP)

(73) Assignee: Kabushiki Kaisha Matsui Seisakusho, Osaka (JP)

( * ) Notice: Subject to any disclaimer, the term of this patent is extended or adjusted under 35 U.S.C. 154(b) by 574 days.

(21) Appl. No.: 13/234,458

(22) Filed: Sep. 16, 2011

(65) Prior Publication Data

US 2012/0070236 A1 Mar. 22, 2012

(30) Foreign Application Priority Data

Sep. 17, 2010 (JP) ................................ 2010-210192

(51) Int. Cl.
*B65G 53/46* (2006.01)
*B65G 53/40* (2006.01)

(52) U.S. Cl.
CPC ..................................... *B65G 53/40* (2013.01)
USPC ........................... 406/127; 406/106; 406/168

(58) Field of Classification Search
CPC .... B65G 53/4683; F23K 3/02; B65D 90/587; B65D 90/626
USPC ........................................ 406/127, 106, 168
See application file for complete search history.

(56) References Cited

U.S. PATENT DOCUMENTS

| | | | | | |
|---|---|---|---|---|---|
| 2,184,248 | A | * | 12/1939 | Bonotto ......................... | 422/273 |
| 2,321,015 | A | * | 6/1943 | Davis ............................. | 34/428 |
| 2,467,805 | A | * | 4/1949 | Bressler ......................... | 122/4 R |
| 3,841,465 | A | * | 10/1974 | Miller et al. .................... | 241/247 |
| 4,274,786 | A | * | 6/1981 | Svensson et al. .............. | 414/218 |
| 4,436,038 | A | * | 3/1984 | Leikert et al. ................. | 110/347 |
| 4,630,554 | A | * | 12/1986 | Sayler et al. .................. | 110/264 |
| 4,702,177 | A | * | 10/1987 | Narisoko et al. .............. | 110/110 |
| 4,738,687 | A | * | 4/1988 | Smieskol et al. ........... | 48/197 R |
| 4,747,741 | A | * | 5/1988 | Stadler ........................... | 414/202 |
| 4,756,348 | A | * | 7/1988 | Moller ........................... | 141/83 |
| 4,776,493 | A | * | 10/1988 | Tegel ............................. | 222/196 |
| 4,885,999 | A | * | 12/1989 | Baba et al. .................... | 110/186 |
| 5,388,537 | A | * | 2/1995 | Larson et al. ................. | 110/346 |
| 5,490,745 | A | * | 2/1996 | Thiele et al. .................. | 406/132 |
| 5,615,987 | A | * | 4/1997 | Weist ............................. | 414/218 |
| 7,314,538 | B2 | * | 1/2008 | Lashofer et al. .............. | 162/52 |
| 7,533,778 | B1 | * | 5/2009 | Staples ......................... | 212/166 |
| 7,976,259 | B2 | * | 7/2011 | Craig et al. ................... | 414/218 |
| 8,113,745 | B2 | * | 2/2012 | Aoki .............................. | 406/197 |
| 8,371,323 | B2 | * | 2/2013 | Delves ............................ | 137/1 |

FOREIGN PATENT DOCUMENTS

JP H10-196810 A 7/1998

* cited by examiner

*Primary Examiner* — Joseph Dillon, Jr.
(74) *Attorney, Agent, or Firm* — DLA Piper LLP (US)

(57) ABSTRACT

A discharge apparatus for a powdered or granular material provided at a lower end of a storage part in which a powdered or granular material is stored. The discharge apparatus comprises a material discharge passage connected to the lower end of the storage part and provided with a material discharge port at the terminal end, a valve body opening or closing the discharge port of the material discharge passage, and a valve driving part moving the valve body along a substantially orthogonal direction to a surface of a valve seat around the discharge port. The valve body is so constructed as to form a gap at closed position between the valve body and the surface of the valve seat along the circumferential direction of the discharge port, in which the gap is formed such that a powdered or granular material is not allowed to pass therethrough.

5 Claims, 4 Drawing Sheets

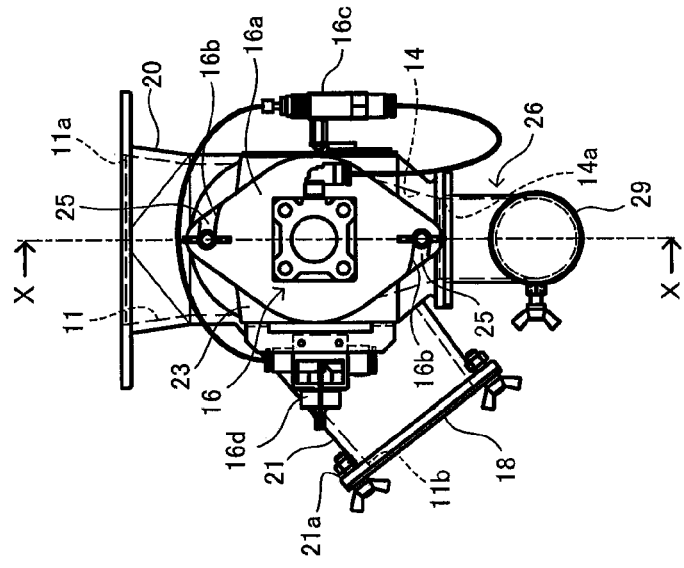
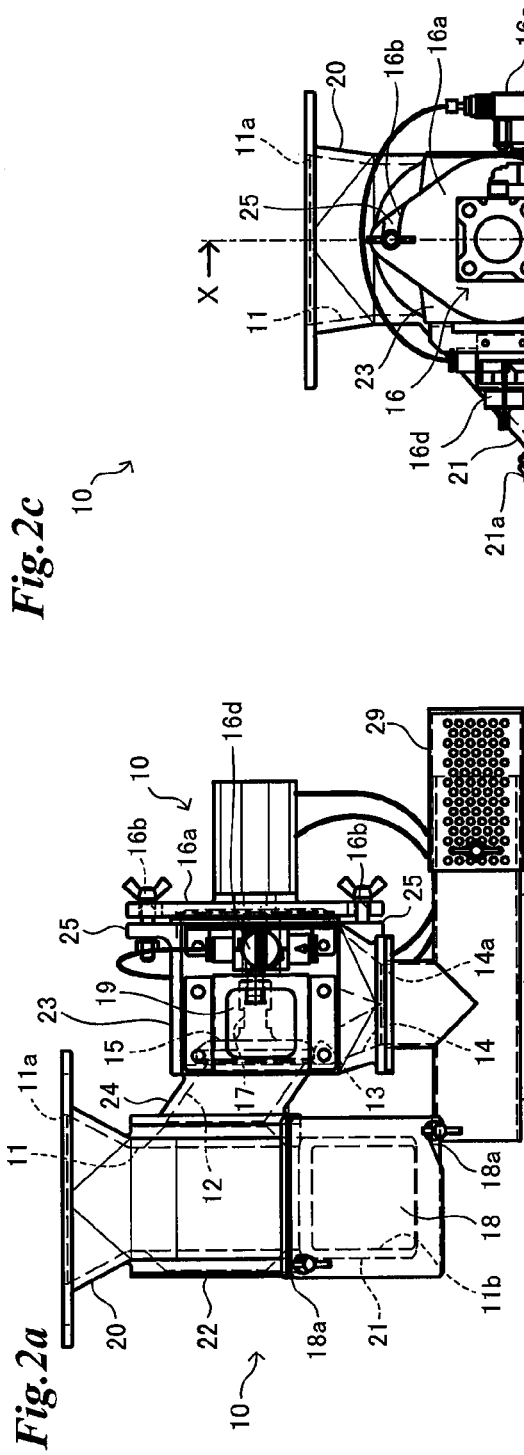

DISCHARGE APPARATUS FOR POWDERED OR GRANULAR MATERIAL AND TRANSPORT SYSTEM FOR THE MATERIAL PROVIDED WITH THE DISCHARGE APPARATUS

TECHNICAL FIELD

The present invention relates to a discharge apparatus for a powdered or granular material provided at the lower end of a storage part storing a powdered or granular material and further to a transport system for a powdered or granular material provided with the discharge apparatus.

BACKGROUND ART

In the prior art, a slide-type discharge apparatus having a plate-like valve body (partition plate) which slides in a horizontal direction so as to be orthogonal to an input pipe at the lower end of the storage part provided almost vertically is well known as a material discharge apparatus for a powdered or granular material provided at the lower end of the storage part storing a powdered or granular material. The slide-type discharge apparatus is designed in such a manner that the plate-like valve body is slidably moved in a valve casing having an opening communicating with the input pipe to open or close the input pipe, thereby discharging a powdered or granular material. There has been such a problem that a powdered or granular material gets stuck between the plate-like valve body and the opening of the valve casing and further operation failure and damage are caused by sticking of material.

Patent Literature 1 discloses a valve system for a powdered or granular material being connected to a pipe connected to a hopper and having a slant inlet cylinder and a rotary cylinder with a bottom rotatably fitted to the inlet cylinder from below so as to be concentric with the inlet cylinder but not to slidably contact the inlet cylinder. In the valve system, the rotary cylinder is rotated at a position which covers a downward opening of the inlet cylinder and a position which does not cover it, thereby controlling material discharge (flow). In addition, the valve system has a gap which is slightly larger than the particle diameter of the material between the rotary cylinder and the inlet cylinder, thereby preventing breakage of the material and rotating the rotary cylinder smoothly.

CITATION LIST

Patent Literature

PTL 1: JP-H10-196810-A

SUMMARY OF INVENTION

Technical Problem

However, according to the valve system disclosed in Patent Literature 1, the rotary cylinder with the bottom which is driven and rotated is fitted to the slant inlet cylinder, so that there has been a problem of making the structure complicated. Furthermore, a powdered or granular material can be unexpectedly discharged from the gap between the inlet cylinder and the rotary cylinder. Namely, it is supposed that the material which flows from the inlet cylinder to the rotary cylinder enters the gap while repeating start and stop of discharge, and the material is kept at an angle of repose at the time of stopping discharge. However, the material can unexpectedly drop in or be discharged by vibration or generation of air current. Specifically, when there is a pressure difference between the inlet of the valve system and the outlet thereof, for example, heated gas is supplied to a hopper connected to the inlet or transport air is supplied to a transport pipe connected to the outlet, the material can be unexpectedly discharged via the gap by the pressure difference even if the rotary cylinder is at a position covering the downward opening of the inlet cylinder, thereby making quantitative discharge difficult.

The present invention is proposed in view of the above-mentioned problems, and has an object to provide a discharge apparatus for a powdered or granular material which prevents operation failure and damage caused by sticking of material and is capable of achieving quantitative discharge with a simple structure and to provide a transport system for a powdered or granular material having the discharge apparatus.

Solution to Problem

In order to achieve the above-mentioned objects, the present invention relates to a discharge apparatus for a powdered or granular material provided at a lower end of a storage part in which a powdered or granular material is stored and is characterized in that the apparatus comprises a material discharge passage connected to the lower end of the storage part and provided with a material discharge port at the terminal end, a valve body opening or closing the discharge port of the material discharge passage, and a valve driving part moving the valve body along a substantially orthogonal direction to a surface of a valve seat around the discharge port, wherein the valve body is so constructed as to form a predetermined gap at closed position between the valve body and the surface of the valve seat along the circumferential direction of the discharge port, in which the gap is formed such that a powdered or granular material is not allowed to pass thereurough.

In the discharge apparatus for a powdered or granular material of the present invention, sticking and breakage of the material are reduced by a simple structure, comparing to a prior discharge apparatus in which a valve body is slid and moved in a direction orthogonal to the opening (discharge port).

The valve body is designed in such a manner that a predetermined gap which does not allow the material to pass is formed between the valve body and the surface of the valve seat along the circumferential direction of the discharge port at closed position, thereby effectively preventing operation failure and damage caused by sticking of material. Namely, when the valve body is designed so as to abut the valve seat around the discharge port at closed position, the material can get stuck when the valve body becomes a closed position from an open position. When such a sticking is caused each time of opening or closing the valve, load can be repeatedly exerted on the valve body and the valve body or the rod of the valve driving part connected to the valve body can be damaged. However, in the discharge apparatus for a powdered or granular material of the present invention, the load to the valve body caused by sticking can be reduced by the gap.

Furthermore, the gap is sized so as not to pass the material, so that unexpected discharge of the material does not occur when the valve body is at closed position, thereby achieving quantitative discharge.

In the present invention the material discharge passage can comprise a first discharge passage provided in substantially vertically and connected to the lower end of the storage part, and the second discharge passage provided obliquely downward, connected to the first discharge passage, and having the discharge port at the terminal end, the valve seat is formed in shape of substantially vertical surface around the discharge port, and the valve body moves in substantially horizontally to open or close the discharge port by the valve driving part.

Such a structure becomes simple comparing with the structure in which the valve body is moved obliquely upward corresponding to the inclination of the second discharge passage. A powdered or granular material can smoothly flow by its own weight from the lower end of the storage part by the first discharge passage and the second discharge passage; in addition, its own weight of the material (pressure of the material) acting on the valve body can be reduced, thereby smoothly opening or closing the valve body.

Furthermore, a transport system for a powdered or granular material of the present invention is characterized in that the transport system comprises a storage part for a powdered or granular material having the above-mentioned discharge apparatus at the lower end, a material transport pipe for pneumatically transporting the powdered or granular material discharged from the discharge apparatus, and a control part for controlling the valve driving part of the discharge apparatus.

In such a transport system for the material of the present invention, the storage part has at the lower end the discharge apparatus for the material of the present invention, so that load on the valve body caused by sticking of material can be reduced and the valve body can be smoothly opened or closed. Therefore, quantitative discharge to a transport destination can be achieved and stable transportation to the' destination can be also achieved.

Also in the transport system for a powdered or granular material of the present invention, the storage part can be a drying hopper in which a powdered or granular material is dried by supplying heated gas thereinto.

By such a structure, heated gas and dried gas in the drying hopper are introduced to the material transport pipe in such a manner that it leaks thereinto from the gap of the discharge apparatus, and the material transport pipe and a temporary storage part such as a collector at the transport destination become a positive pressure, thereby reducing the amount of outside air introduced into such inner spaces. Therefore, moisture absorption and temperature fall of the heated and dried material to be transported and stored in the material transport pipe and the temporary storage part of the transport destination can also be reduced.

Furthermore, in the transport system for a powdered or granular material of the present invention, the control part can control the valve driving part to intermittently open the valve body when the material in the storage part is discharged and pneumatically transported to a transporting destination based on material request signals from the destination connected to the material transport pipe.

Such a structure makes the valve body intermittently open, the material transport pipe is prevented from being closed by the material when the ratio of the material in the material storage pipe (mixing ratio, ratio of mass flow of the material to that of air in the material transport pipe) rapidly increases, thereby achieving stable pneumatic transportation.

Advantageous Effects of Invention

The discharge apparatus for a powdered or granular material of the present invention as mentioned above can prevent operation failure and damage caused by sticking of material with a simple structure and can execute quantitative discharge.

BRIEF DESCRIPTION OF DRAWINGS

FIG. 2a to FIG. 2c diagrammatically illustrate the discharge apparatus, FIG. 2a is a schematic front view, FIG. 2b is a schematic plan view, and FIG. 2c is a schematic side view.

DESCRIPTION OF EMBODIMENTS

The embodiments of the present invention are explained referring to drawings.

FIG. 1 to FIG. 4 are explanatory views illustrating a discharge apparatus for a powdered or granular material, an embodiment of a transport system of the material having the discharge apparatus and the operation embodiment thereof according to the embodiments of the present invention.

Figure 1:
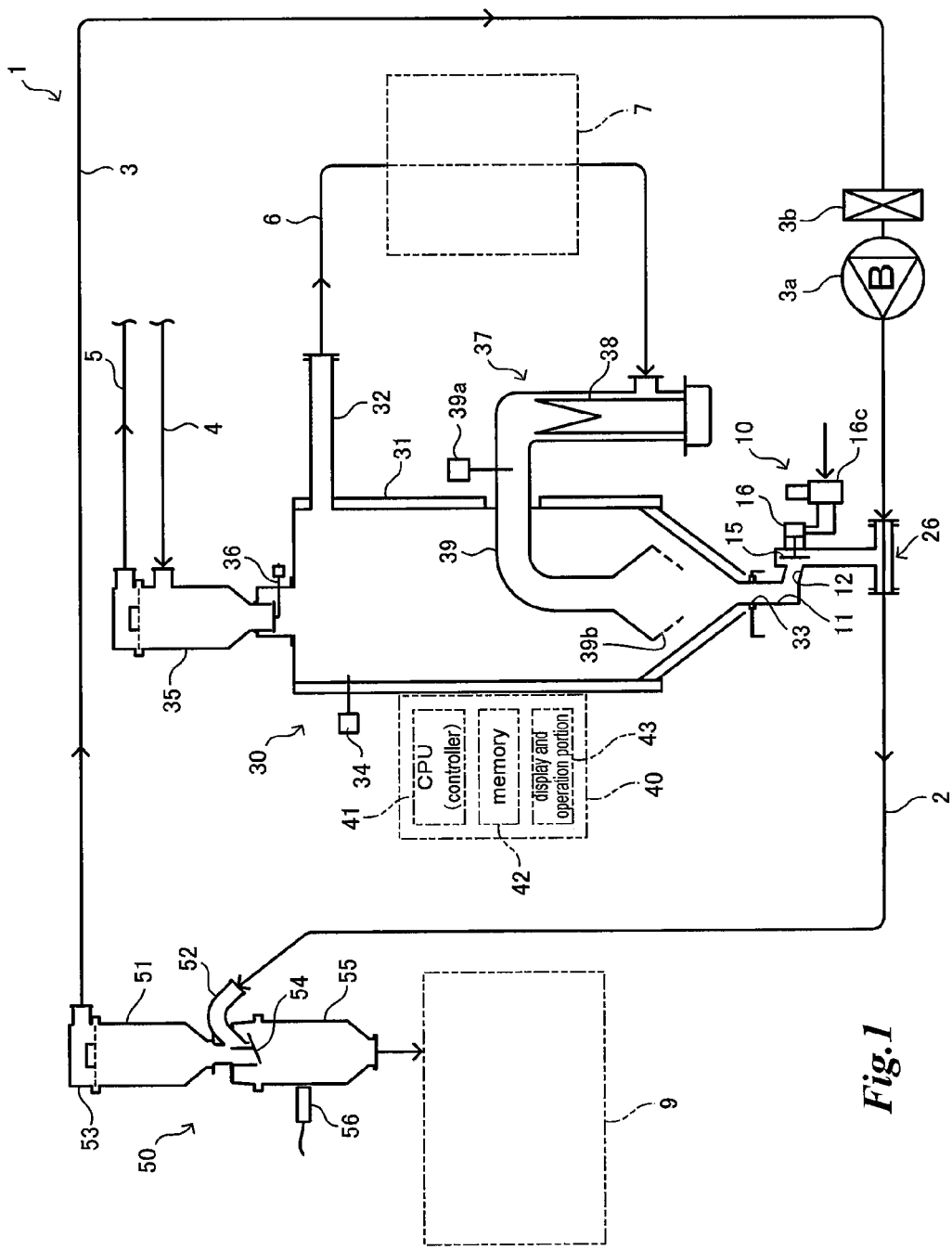
FIG. 1 illustrates a schematic structure diagrammatically showing one embodiment of a transport system having a discharge apparatus for a powdered or granular material of one embodiment of the present invention.

Pipes (gas pipes, transport pipes for a powdered or granular material, and the like) for flowing gas (heated air, transport air) and a powdered or granular material are diagrammatically shown with solid lines in FIG. 1.

FIG. 1 shows an embodiment of the discharge apparatus 10 for a powdered or granular material according to the embodiment of the present invention provided at the lower end of a drying hopper 30 as a storage part. In the embodiment the drying hopper 30 provided with the discharge apparatus 10 is incorporated to a transport system 1 for a powdered or granular material including a control panel 40 having a CPU 41 for controlling each member and a material transport pipe 2 for pneumatically transporting the material discharged from the discharge apparatus 10 to a material collection and supply part 50 on the molding machine side as a transport destination.

The powdered or granular material indicates material in the form of powder or granule and includes material in the form of minute flake, short fiber, sliver and the like.

The above-mentioned material can be any material such as a synthetic resin material like resin pellets and resin fiber pieces, a metal material, a semiconductor material, a wood material, a drug material, and a food material.

The powdered or granular material includes a mixed powdered or granular material of various materials prepared by a blending apparatus and the like as a material supplier (origin of transportation of the drying hopper 30), for example, it can be a virgin material, a pulverized material, master batch, various additive agents and the like.

The embodiment of the present invention exemplifies a material collection and supply part 50 on the molding machine side as a transport destination provided on a molding machine 9 such as an injection machine and having an air mixing hopper 51 as an upper collection part and a storage tank 55 as a temporary storage connected under the hopper 51.

The air mixing hopper 51 has at the bottom a material acceptance pipe 52 connected to one end of the material transport pipe 2 connected to the discharge apparatus 10 to be mentioned later and it has at the top a separating portion 53 connected to one end of an air pipe 3 (pipe for transporting air). The material acceptance pipe 52 is formed as a connection pipe in such a manner that a portion connected to the end of the material transport pipe 2 is diverged into two pipes, one of which is connected to the lower end of the air mixing hopper 51 and the other of which is connected to the upper portion of the storage tank 55. A damper 54 is provided at a lower inlet of the connection pipe which is connected to the upper portion of the storage tank 55 for opening or closing the inlet. Although any damper can be used as the damper 54, the figure exemplifies a flap-type damper (flap damper) 54 swingably hung with a string (in the form of wire) member. The flap damper 54 is suck by action (negative pressure action) of suction air of the air pipe 3 to close the lower inlet and opens the inlet by its own weight of a powdered or granular material when the suction air is stopped.

The other end of the material transport pipe 2 is connected to a connection pipe to the material transport pipe 27 (refer to FIG. 3) provided under the discharge apparatus 10. The separating portion 53 separates transport air and a transported powdered or granular material by means of a filter, a mesh-like porous plate or the like and discharges the separated transport air into the air pipe 3.

The other end of the air pipe 3 is connected to a suction side of a transport blower 3a as a transport air source and a filter 3b for trapping dust and the like is provided on the upstream side of the suction side of the transport blower 3a. The air pipe 3 at the discharge side of the transport blower 3a is connected to an air induction pipe 28 (refer to FIG. 3) provided under the discharge apparatus 10. As mentioned above, transport air substantially circulates through the discharge apparatus 10, the material transport pipe 2, the material collection and supply part 50 on the molding machine side and the air pipe 3.

The storage tank 55 has a material sensor 56 for detecting reduction of storage level of a powdered or granular material in the storage tank 55 and for outputting material request signals. A contact type level switch, a non-contact type capacitance level meter or the like can be used as the material sensor 56.

In the above-mentioned material collection and supply part 50 on the molding machine side, when the transport blower 3a is driven, the material discharged from the discharge apparatus 10 to be mentioned later is pneumatically transported to the air mixing hopper 51 through the material transport pipe 2 by the transport air circulated via the material transport pipe 2, the air mixing hopper 51 and the air pipe 3. The material flows by suction air in the air mixing hopper 51 and is mixed while separating the material and the transport air including minute powder and the like by means of the separating portion 53. When the transport blower 3a is stopped, the material flown in the air mixing hopper 51 falls by its own weight to open the flap damper 54 by its own weight and is fed in the lower storage tank 55. The transport blower 3a is controlled to be driven by the CPU 41 to be mentioned later according to a predetermined program for discharge and transport to be mentioned later.

The injection machine 9, not detailed, is designed in such a manner that the powdered or granular material fed from the material inlet via the material collection and supply part 50 on the molding machine side is melted in a cylinder, one shot of melted resin is injected into a mold (not shown in the figure) from the tip end of the cylinder, and a resin molded product is produced.

The material collection and supply part on the molding machine side as a transport destination is not limited to the above-mentioned one and any member can be used as long as the material transported through the material transport pipe 2 is collected and temporarily stored.

In the embodiment of the present invention, the transport destination of the material transported by the transport system 1 for the material is not limited to the collection hopper provided on the injection machine for producing a synthetic resin molded article and includes a collection hopper provided on an injection machine for other materials and other molding machines such as an extruder and a compression machine. In addition, the transport destination can be a charge hopper as a temporary storage provided in a pre-stage of such molding machines, and a temporary storage and a scale hopper and so on of a blending apparatus or the like for blending various materials at a predetermined ratio. The transport destination is not limited to one and the material can be transported into a plurality of transport destinations by diverging the material transport pipe.

The drying hopper 30 has a hopper body 31 whose upper portion is formed like a cylinder and whose lower portion is formed like an inverted-cone, a collecting part 35 provided on the hopper body 31, the discharge apparatus 10 provided at the lower end of the hopper body 31, and heated gas supply part 37 for supplying heated gas to the hopper body 31. The collecting part 35 is connected to a material transport pipe 4 whose terminal end is connected to a material supplier (origin of transportation) such as a material tank and a blending apparatus, and an air suction pipe 5 for sucking air in the collecting part 35. A transport blower or the like are connected to the terminal end of the air suction pipe 5 as the transport air source. The air suction pipe 5 and the air pipe 3 connected to the material collection and supply part 50 on the molding machine side can be connected via a switch valve or the like and the transport blower 3a can also be used as a transport blower for transporting a powdered or granular material to the drying hopper 30.

A damper 36 is provided for opening or closing the lower end inlet of the inlet pipe provided under the collecting part 35. Any damper can be provided, but a flap-type damper (flap damper) 36 swingably supported to the inlet pipe with an axial member is shown in the figure as an embodiment. The flap damper 36 is opened by the weight of the powdered or granular material collected in the collecting part 35. Once the material is fed in the hopper body 31 from the inlet pipe connected to the inlet of the hopper body 31 when the flap damper 36 is opened, the flap damper 36 is designed to be closed by a closing means such as a weight and a biasing means like a spring.

The dampers for the collection part 35 and the material collection and supply part 50 on the molding machine side are not limited to the above-mentioned dampers, a slide damper, or the like can be used or no damper is provided.

A material sensor 34 for detecting reduction of storage level of a powdered or granular material in the hopper body 31 and outputting material request signals are provided at the upper portion of the hopper body 31. The material sensor 34 includes a contact type level switch and the like and a non-contact type capacitance level meter and the like as mentioned above.

An exhaust port for discharging gas passing through a powdered or granular material layer is provided at the upper portion (upper portion of a side wall in the figure) of the hopper body 31 and is connected to an exhaust pipe 32.

The hopper body 31 is provided with the heated gas supply part 37 for supplying heated gas into the hopper body 31.

This embodiment is provided with a dehumidification unit 7 having a gas circulation route 6 connecting the exhaust pipe 32 of the hopper body 31 and a gas inlet of the heated gas supply part 37.

The heated gas supply part 37 has a heater (heating device) 38 and a gas supply pipe 39 for supplying gas passing through the heater 38 into the hopper body 31 in the figure. The gas supply pipe 39 is led to the hopper body 31 and the terminal end is provided with an exhaust port 39b for exhausting the supplied heated gas into the hopper body 31. The exhaust port 39*b* is provided adjacent to the lower end in the hopper body 31, is also provided on the approximate center in the hopper 31 in plan view in a form of circular in plan view, and is designed to uniformly disperse the gas supplied through the gas supply pipe 39 to supply the gas into the hopper body 31. The lower end of the gas supply pipe 39 having the exhaust port 39*b* is enlarged downwardly (conical shape) and works as a rectifying member. The powdered or granular material stored in the hopper body 31 can smoothly follow first-in first-out order by such a rectifying member.

A member shown in FIG. 1 with a reference sign 39*a* provided with the gas supply pipe 39 is a temperature sensor for detecting the temperature of gas to be supplied to the hopper body 31 and power distribution to the heater 38 is controlled in such a manner that the temperature of supplied gas becomes a predetermined degree based on the temperature detected by the temperature sensor 39*a*. The predetermined temperature is appropriately determined depending on the kinds of the material, for example, it can be around 60 to 180 degrees centigrade when a synthetic resin material is dried.

The dehumidification unit 7, not detailed, has an absorbent containing an absorbing agent and the like, a blower for circulating gas supplied in the gas circulation route 6, a recycle means for recycling the absorbent containing moisture, and the like. In the dehumidification unit 7, gas discharged from the exhaust pipe 32 of the hopper body 31 is dehumidified by the absorbent containing an absorbing agent and thus dehumidified gas (due-point controlled gas) is supplied to a gas inlet of the heated gas supply part 37 via the gas circulation route 6.

Well-known dehumidification units can be appropriately used as the dehumidification unit 7, for example, a dehumidification unit having a honeycomb rotor as an absorbent, a dehumidification unit having one or a plurality of absorbing towers can be applied. On the other hand, the heated gas supply part can have a heater blower as a blowing means for taking in outside air and supplying heated gas (heated air) heated by passing through the heater to the hopper body 31, without providing such a dehumidification unit 7. In such a case, the terminal end and so on of the exhaust pipe of the hopper body can be provided with a dust collection unit having a dust collection filter for trapping powder dust, grit and dust, and the like included in discharged air and having a dust collection box for containing trapped dust and so on.

The above-mentioned drying hopper 30 is controlled by the CPU 41 to be mentioned later according to a predetermined drying program, heated gas is supplied via the heated gas supply part 37, and the powdered or granular material stored in the hopper body 31 is dried and processed.

The dried material is discharged from a lower end discharge port 33 when the discharge apparatus 10 to be mentioned later is opened. When the storage level of the material in the hopper body 31 becomes under a predetermined level accompanied with the material discharge, the transport air source is driven, the material to be pneumatically transported is collected in the collecting part 35, the flap damper 36 provided under the collecting part 35 is opened, thus the material is sequentially fed in the hopper body 31.

The transport air source can be controlled to be driven by the CPU 41 to be mentioned later based on material request signals of the material sensor 34.

The control panel 40 has the CPU 41 which controls the above-mentioned devices and members of the transport system 1, and the discharge apparatus 10 to be mentioned later according to a predetermined program, a memory portion 42 and a display and operation portion 43 which are connected to the CPU 41 with signal lines, respectively.

The CPU 41 as a control part is connected to the above-mentioned devices and members, sensors, a changeover valve 16*c* (refer to FIG. 1 and FIG. 2) of an air cylinder 16 as a valve driving part of the discharge apparatus 10 and the like with signal lines. On the display and operation portion 43 various settings and operations are done, data such as open time and closed time to be mentioned later are set and inputted, and several setting conditions and several operation modes and so on are displayed.

The memory portion 42 is constituted with various memories and stores the setting conditions and input value set and inputted with the display and operation portion 43, various programs such as a control program for executing basic operations to be mentioned later, various predetermined operation conditions and so on.

Next, a specific example of the discharge apparatus 10 for a powdered or granular material provided at the lower end of the drying hopper 30 provided with the transport system 1 for a powdered or granular material is explained according to the embodiment of the present invention referring to FIG. 2 and FIG. 3.

As shown in FIG. 3 the discharge apparatus 10 is connected to the discharge port 33 at the lower end of the drying hopper 30 for storing the material and has material discharge passages 11, 12 having a material discharge port 12*a* at the terminal end, a valve body 15 for opening or closing the discharge port 12*a* of the material discharge passages 11, 12, and the valve driving part 16 for moving the valve body 15 along a direction substantially orthogonal to a valve seat 13 around the discharge port 12*a*.

In this embodiment the material discharge passages 11, 12 are constituted in such a manner that the first discharge passage 11 formed in a substantially vertical direction is connected to the discharge port 33 at the lower end of the drying hopper 30, and the second discharge passage 12 is connected to the first discharge passage 11, is formed obliquely downward, and has the disc-like material discharge port 12*a* at the terminal end. The surface of the valve seat 13 formed around the discharge port 12*a* is substantially vertical (in a form of plane perpendicular to a vertical surface) and the valve body 15 is moved in a substantially horizontal direction by the valve driving part 16 to open or close the discharge port 12*a*.

The first discharge passage 11 has at the upper end an inlet 11*a* communicated with the discharge port 33 at the lower end of the drying hopper 30 as shown in FIG. 2 and FIG. 3. The first discharge passage 11 is comparted by a discharge connection pipe 20 connected to the lower end of the drying hopper 30 via a flange provided at the upper end. In the figure the discharge connection pipe 20 is formed such that the upper portion is like an inverted-cone provided under the flange and the lower portion is like a rectangular tube. Substantially circular openings are provided at both walls of the rectangular tubular portion, respectively, one is closed by a cover member 22, and the other is connected to a slant pipe 24 computing the second discharge passage 12.

A remaining material discharge pipe 21 is provided under the lower portion of the rectangular tubular portion in an obliquely downward direction and a shutter for discharging remaining material 18 is provided so as to be able to open or close an exhaust port for remaining material 11*b* at the lower end of the material discharge pipe 21. Any structure can be used for fixing the shutter for discharging remaining material 18 in an easy-to-open-and-close manner at the lower end of the remaining material discharge pipe 21, but the figures show an example in which a flange 21*a* provided around the exhaust port for remaining material 11b at the lower end of the remaining material discharge pipe 21 is provided with a plurality of insertion holes (two holes in the figure) to pass through a butterfly bolt, and the shutter for discharging remaining material 18 is provided with a plurality of cutouts 18a, 18a (two cutouts in the figure) to which the butterfly bolt can be engaged and screwed. In this structure, when the butterfly bolt is screwed to a nut overlapped on the insertion hole of the flange 21a of the remaining material discharge pipe 21, the shutter for discharging remaining material 18 can be fixed to the lower end of the remaining material discharge pipe 21 so as to be freely opened or closed. In the structure provided with the remaining material discharge pipe 21 and the shutter for discharging remaining material 18 for opening or closing the exhaust port for remaining material 11b at the lower end, when the shutter for discharging remaining material 18 is detached (opened), the remaining material can be easily discharged in case of exchanging a powdered or granular material stored in the drying hopper 30.

The second discharge passage 12 is comparted by the slant pipe 24 provided at one side of a damper case 23 containing the valve body 15 to be mentioned later and the like. The slant pipe 24 is connected to the rectangular tubular portion with a flange in such a manner that the second discharge passage 12 is aligned to an opening formed on the side wall of the rectangular tubular portion of the discharge connection pipe 20 and the slant pipe 24 is formed to extend obliquely downward from the side wall of the rectangular tubular portion.

The damper case 23 is connected to the terminal end of the slant pipe 24 and comparts a valve containing space 14 formed like a cuboid. The valve containing space 14 is formed in such a manner that the valve body 15 can move in substantially horizontal direction by the valve driving part 16 to be mentioned later and a powder or granular material can be smoothly discharged from the discharge port 12a when the valve body 15 is opened.

The valve seat 13 is provided around the discharge port 12a which is formed at the terminal end of the second discharge passage 12 and opens into the valve containing space 14. The valve seat 13 is formed along the entire circumference of the discharge port 12a so as to slightly bulge the inner wall surface of the damper case 23 and the surface of the valve seat 13 is substantially vertical as mentioned above. Namely, the valve seat 13 is formed so as to face a substantially horizontal direction.

An opening to receive a connecting portion 17 including the valve body 15 to be mentioned later and a rod portion of the valve driving part 16 is formed on one side of the damper case 23 facing the valve seat 13. A fitting base 16a of the valve driving part 16 to be mentioned later is attached to upper and lower flange portions 25, 25 formed around the opening. This embodiment is designed in such a manner that the valve driving part 16 is detachably provided for the damper case 23 and the upper and lower flange portions 25, 25 have insertion holes for butterfly bolts, respectively, as mentioned above. In this embodiment, an opening is provided on a side wall of the damper case 23 and is sealed with an inspection window 19. This inspection window 19 is formed transparent with a reinforced glass or a reinforced resin in order that the open-close operations of the valve body 15 and the discharge state of a powdered or granular material can be visually observed.

The valve containing space 14 is formed such that the upper portion is substantially rectangular and the lower portion is like an inverted-cone, and the valve containing space 14 has at the lower end a supply port 14a for supplying the material stored in the drying hopper 30 to a transport destination.

The valve body 15 is formed like a disc whose diameter is larger than that of the discharge port 12a and has a concave portion open to the discharge port 12a. The circumferential edge of the concave portion is substantially formed circular (like a ring) corresponding to the valve seat 13.

Figure 3A:
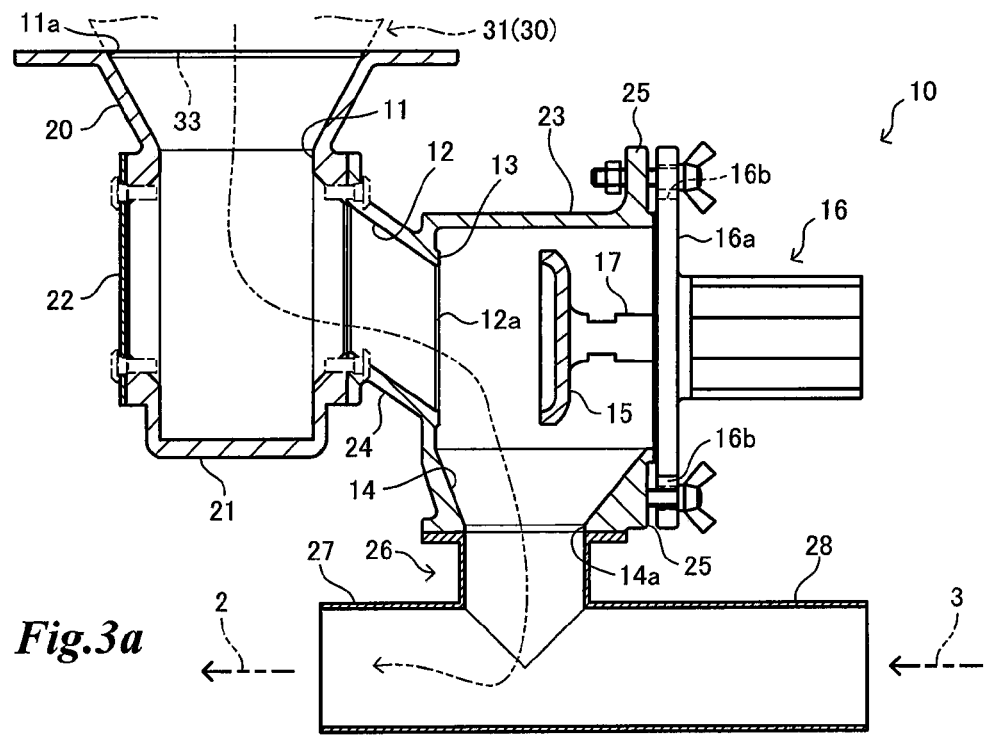
FIG. 3a and FIG. 3b are explanatory views of discharge operation of the discharge apparatus and illustrate schematic vertical sections taken along the line X-X in FIG. 2c.
Figure 3B:
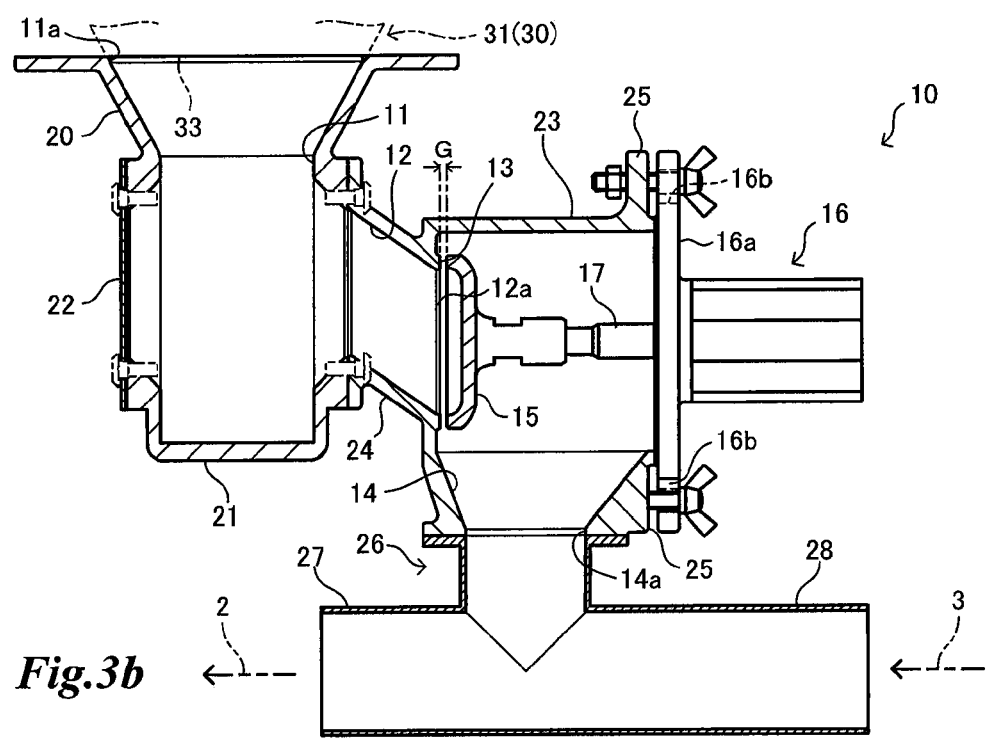

The valve body 15 moves along the substantially horizontal direction by the valve driving part 16 to be mentioned later as shown in FIG. 3. The valve body 15 is designed to keep a predetermined gap G which does not allow a powdered or granular material to pass between the valve body 15 and the surface of the valve seat 13 along the circumferential direction of the discharge port 12a when the valve body 15 is closed as shown in FIG. 3b. In this embodiment the valve body 15 is designed to be provided with the predetermined gap G between the surface, facing the valve seat 13, of the circumferential edge of the valve body 15 and the surface of the valve seat 13 all around the circumferential direction of the open edge of the discharge port 12a when the valve body 15 is closed. The predetermined gap G is preferably almost uniform along the circumferential direction, but the lower gap and the upper gap can be different.

The gap G can be determined depending on the particle diameter of a powdered or granular material to be stored in the drying hopper 30 and can be set to be smaller than the particle diameter (smallest diameter) of the material. For example, when the material like resin pellets whose particle diameter is about 1 to 3 mm (smallest diameter) is stored in the drying hopper 30, the gap G can be around 0.4 mm to 3 mm. In case of pulverized material whose particle diameter is not uniform, the gap G can be around 0.4 mm to 2 mm. In view of effectively preventing damage of the valve body 15, the connecting portion 17 and the like caused by sticking of material, the gap G can be equal to or over $\frac{1}{3}$ of the above-mentioned particle diameter and less than that, more preferably equal to or over $\frac{1}{2}$ of the above-mentioned particle diameter and less than that.

The air cylinder 16 is exemplified as the valve body driving portion 16 in this embodiment. A connection member provided on the back surface (surface opposite to the surface of the valve seat 13) of the valve body 15 is coupled to a rod portion of the air cylinder 16 with a bolt or the like and is diagrammatically shown as a connecting portion 17 including the rod portion and the connection member in the figure.

The stroke (extension or contraction) of the rod portion of the air cylinder 16 is designed in such a manner that the predetermined gap G is formed between the valve body 15 connected to the connecting portion 17 and the valve seat 13 when being extended as shown in FIG. 3b and the valve body 15 is departed from the discharge port 12a to smoothly discharge a powdered or granular material from the discharge port 12a when the rod portion is contracted as shown in FIG. 3a.

A length adjustment means can be provided at the connecting portion and the like of the rod portion of the air cylinder 16 and the connection member of the valve 15 for adjusting the length along the expanding or contracting direction and the predetermined gap G which is formed when the rod portion is extended can be adjusted depending on the particle diameter of the material.

The front and back of the casing of the air cylinder 16 in the extending direction are connected to compressed air supply tubes for supplying compressed air to the front and back of the piston in the casing in the extending direction, respectively. The compressed air supply tube is connected to the electromagnetic changeover valve 16c such as a solenoid valve attached to the damper case 23. The changeover valve 16c is controlled by CPU 41 and extends or contracts the rod portion of the air cylinder 16, namely opens or closes the valve body 15.

The reference sign 16d in FIG. 2 indicates a finger valve (hand valve) which is connected between the changeover valve 16c and the compressed air source. When the finger valve 16d is opened, compressed air can pass, on the other hand, when the finger valve 16d is closed, compressed air is stopped.

The fitting base 16a fixed to the damper case 23 is provided on the front end surface in the extending direction of the air cylinder 16 in this embodiment and a plurality of (two in the figure) cutouts 16b, 16b are provided at the upper and lower portions of the fitting base 16a for engaging the butterfly valves to be screwed. The air cylinder 16 can be easily detached from the damper case 23 by such a structure, thereby facilitating cleaning in the damper case 23, the valve body 15 and the connecting portion 17 connected to the air cylinder 16. As a result, a powdered or granular material adhered on the inner wall of the damper case 23, the valve body 15 and the connecting portion 17 is easily removed, so that contamination and the like can be prevented when the material to be stored in the drying hopper 30 is exchanged.

The valve body driving portion for moving the valve body 15 is not limited to the above-mentioned air cylinder 16 and a hydraulic cylinder, an electric cylinder, an electric screw shaft (ball screw and the like) and so on can be used.

One connection pipe like the letter T of a transport nozzle 26 is connected via a flange to the supply port 14a opening downwardly at the lower end of the damper case 23. The above-material transport pipe 2 is connected to the connection pipe to the material transport pipe 27 diverged from the one connection pipe. On the other hand, the air induction pipe 28 diverged from the one connection pipe is connected to the air pipe 3. The member shown with the reference sign 29 in FIG. 2 is a filter detachably covered to the air induction pipe 28. The filter 29 is not required and is detached when transport air is designed to be substantially circulated through the discharge apparatus 10, the material transport pipe 2, the collection and supply part 50 on the molding machine side and the air pipe 3 like the transport system 1 of the present invention. On the other hand, when the collection and supply part 50 on the molding machine side and the discharge apparatus 10 are not connected to the air pipe 3, for example, the exhaust side of the transport blower 3a provided for the air pipe 3 is opened, the filter 29 can be attached to the air induction pipe 28 to remove foreign substances and so on and to take in outside air and the like. The transport embodiment is not limited to the above-mentioned case in that the transport blower 3a is driven to work suction air on the material transport pipe 2, and compressed air can be supplied for transportation under pressure. In this case, the filter 29 can be detached and the pipes connected to compressed air source can be connected to the air induction pipe 28.

Each member of the discharge apparatus 10 can be made of metallic material such as a stainless steel.

In the discharge apparatus 10 of the embodiment of the present invention as mentioned above, sticking, breakage and so on of a powdered or granular material can be reduced with a simple structure comparing with the apparatus which opens or closes the opening (discharge port) by sliding operation in an orthogonal direction to the opening.

The valve body 15 is designed to keep the predetermined gap G between the valve body 15 and the surface of the valve seat 13 along the circumferential direction of the discharge port 12a at closed position, thereby effectively preventing operation failure and damage caused by sticking of material. Namely, when the valve body 15 is designed to abut the valve seat around the discharge port at closed position, the material may be stuck when the valve body becomes a closed position from an open position. When such sticking is caused each time of open-close operations, load is repeatedly exerted on the valve body 15, as a result the valve body 15, the connecting portion 17 including the rod portion of the valve driving part 16 connected to the valve body 15, and so on may be damaged. However, the gap G reduces the burden on the valve body 15 caused by such sticking. In addition, the gap G is designed so as not to allow the material to pass, so that unintended discharge of the material is prevented when the valve body 15 is at closed position, thereby achieving quantitative discharge.

The embodiment of the present invention has the first discharge passage 11 formed in a substantially vertical direction and connected to the lower end of the drying hopper 30 and the second discharge passage 12 which is connected to the first discharge passage 11 formed in an obliquely downward direction and is provided with the discharge port 12a at the terminal end. The surface of the valve seat 13 like a substantially vertical surface is formed around the discharge port 12a and the valve body 15 is moved in a substantially horizontal direction by the air cylinder 16 to open or close the discharge port 12a.

Therefore, comparing with the embodiment in which the valve body is moved in an obliquely upward direction corresponding to the inclination of the second discharge passage, the structure becomes simple. In addition, its own weight of a powdered or granular material (pressure of powder or granule) exerted on the valve body 15 can be reduced to smoothly open or close the valve body 15 in addition to the fact that the material from the discharge port 33 at the lower end of the drying hopper 30 smoothly flows down by its own weight through the first discharge passage 11 and the second discharge passage 12.

Furthermore, the transport system 1 for a powdered or granular material of the embodiment of the present invention is provided with the drying hopper 30 having the discharge apparatus 10 at the lower end, so that the load on the valve body 15 caused by sticking of material can be reduced, thereby enabling smooth open-close operations of the valve body. Therefore, quantitative discharge becomes possible to the collection and supply part 50 on the molding machine side and stable transportation thereto can be also achieved.

Also in the embodiment of the present invention, the above-mentioned discharge apparatus 10 is provided at the lower end of the drying hopper 30 and the material is pneumatically transported to the collection and supply part 50 on the molding machine side. As a result, heated gas and dried gas in the drying hopper 30 are introduced to the material transport pipe 2 from the gap G of the discharge apparatus 10 in such a manner that they leak therefrom, the pressure in the material transport pipe 2, in the air mixing hopper 51 of the collection and supply part 50 on the molding machine side and the like becomes positive, thereby reducing the amount of outside air introduced into such inner spaces. Therefore, moisture absorption and temperature fall of the material after being heated and dried are prevented.

Specifically in the embodiment of the present invention, transport air is designed to be substantially circulated via the discharge apparatus 10, the material transport pipe 2, the collection and supply portion 50 on the molding machine side, and the air pipe 3. Therefore, the circulation route is roughly blocked off outside air and is substantially filled with heated gas and dried gas when heated gas and dried gas in the drying hopper leak from the gap G of the discharge apparatus 10, thereby more effectively reducing moisture absorption and temperature fall of the heated and dried material.

Figure 4:
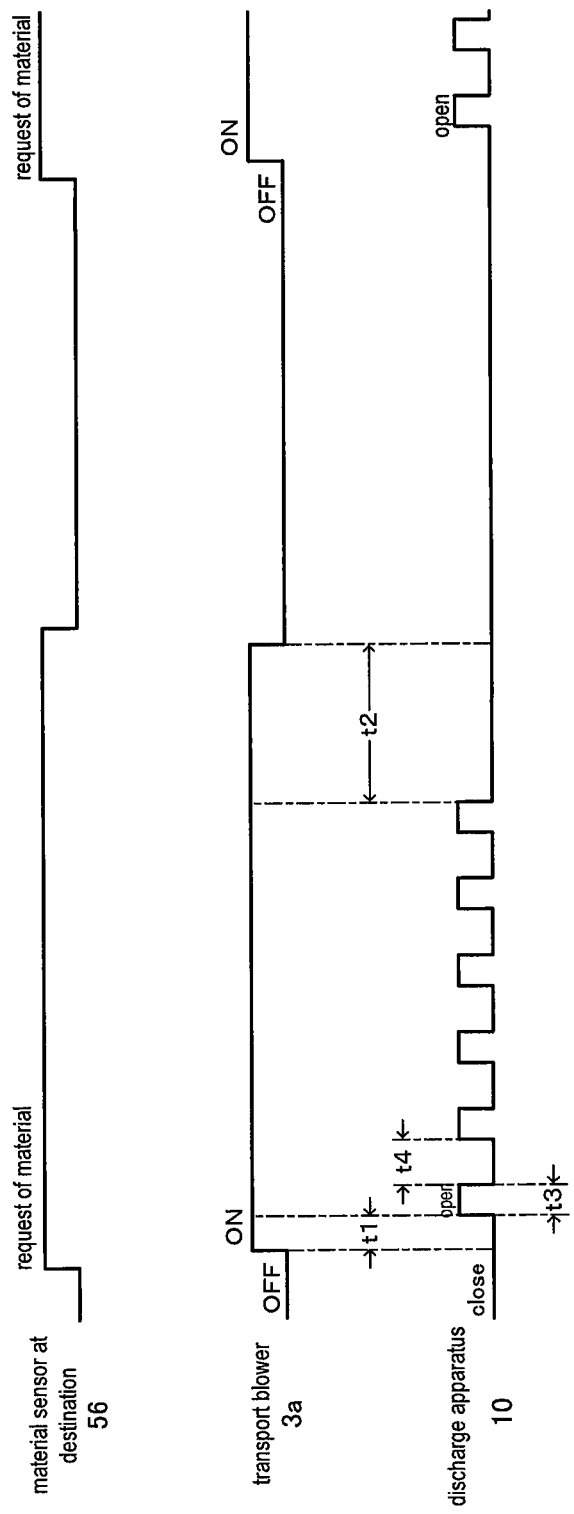
FIG. 4 is a schematic time chart diagrammatically illustrating one embodiment of basic operation executed in the transport system.

One example of the basic operation (discharge operation and transport operation) executed in the transport system 1 for a powdered or granular material according to the above-mentioned embodiment of the present invention is explained based on FIG. 4. The time chart in FIG. 4 diagrammatically shows signals and ON/OFF of each device. The following discharge and transport program can be executed after the temperature of the material stored in the drying hopper 30 is increased to a predetermined value, at least the material in the lower layer is dried at predetermined condition, and discharge preparation is ready.

In this operation example, the above-mentioned CPU 41 controls in such a manner that when a powdered or granular material in the drying hopper 30 is discharged to be pneumatically transported to the collection and supply part 50 on the molding machine side depending on the material request signals (empty signal) from the material sensor 56 provided for the collection and supply part 50 on the molding machine side connected to the material transport pipe 2, the air cylinder 16 (more specifically the above-mentioned changeover valve 16c) intermittently opens the valve body 15 of the discharge apparatus 10.

When the material request signals are outputted from the material sensor 56 of the collection and supply part 50 on the molding machine side as shown in FIG. 4, the transport blower 3a is started. In this operation example, the transport blower 3a is controlled to start when a predetermined delay time passes after material request signals are outputted from the material sensor 56. This delay time is set in view of preventing detection error and so on of the material sensor 56, for example a few seconds.

A fixed delay time t1 is set considering the start up time of a driving motor of the transport blower 3a after the transport blower 3a is started. When the delay time t1 passes, the open-close operations of the valve body 15 of the discharge apparatus 10 are designed to be started. The predetermined delay time t1 can be a few seconds as mentioned above.

After the predetermined delay time t1 passes, the valve body 15 of the discharge apparatus 10 is moved by controlling the changeover valve 16c of the air cylinder 16 to become at open position as shown in FIG. 3a. Thus, the discharge port 12a is opened, a powdered or granular material stayed at the upstream side (on the side of the drying hopper 30) is discharged, passes through the valve containing space 14 and is supplied to the transport nozzle 26 from the supply port 14a at the lower end. Transport air is supplied to the transport nozzle 26 by driving the transport blower 3a, so that the material flown downwardly in the transport nozzle 26 is pneumatically transported to the air mixing hopper 51 of the collection and supply part 50 on the molding machine side by the transport air.

An open time t3 when the valve body 15 is at open position can be a few seconds as mentioned above.

After the open time t3 passes, the changeover valve 16c of the air cylinder 16 is controlled to move the valve body 15 of the discharge apparatus 10 to a closed position as shown in FIG. 3b. Thus, the discharge port 12a is closed to stop discharge of a powdered or granular material. In such condition, the predetermined gap G is formed between the valve body 15 and the surface of the valve seat 13 as mentioned above, so that the load on the valve body 15 caused by sticking of material can be reduced and heated gas and dried gas in the drying hopper 30 can flow through the gap G to the circulation route in such a manner that they leak therefrom.

The closed time t4 when the valve body 15 is at closed position can be a few seconds as mentioned above. For example, the open time t3 can be two seconds and the closed time t4 can be three seconds.

The open time t3 and the closed time t4 can be determined in advance and stored in the memory portion 42 or they can be set and inputted as an advance setting and inputting item from the display and operation portion 43. Or the open time t3 and the closed time t4 can be alterable. Specifically in the embodiment of the present invention, the inspection window 19 is provided for the damper case 23 of the discharge apparatus 10, so that discharging status of a powdered or granular material is visually observed from the inspection window 19 and the open time t3 and the closed time t4 can be changed. For example, when too much powdered or granular material is discharged, the open time t3 is reduced or the closing time t4 is increased. Other than the embodiment in the figure in which the open time t3 and the closed time t4 are constant values, they can be reduced or increased each time they are opened.

When the closed time t4 passes, the valve body 15 becomes at open position till the open time t3 passes, thus the valve body 15 is intermittently opened in the same manner. The number of times for intermittently opening the valve body 15 by one output of the material request signals from the material sensor 56 at a time can be from several times to over ten times (six times in the figure). The number of opening times can be determined in advance and be stored in the memory portion 42, or it can be set and inputted as an advance setting and inputting item from the display and operation panel 43. In addition, the number of opening times can be alterable.

After the valve body 15 is intermittently opened as mentioned above, the transport blower 3a is kept to operate till a predetermined delay time of transporting and mixing t2 passes in this embodiment. The delay time of transporting and mixing t2 can be a time period when a powdered or granular material is prevented from staying in the material transport pipe 2 and is flown and mixed in the air mixing hopper 51 while fine powder and so on are eliminated, for example a few seconds to tens of seconds.

The driving time of the transport blower 3a including the delay time of transporting and mixing t2 and the delay time t1 can be determined in advance and stored in the memory portion 42 or can be set and inputted in advance as a setting and inputting item from the display and operation portion 43. In addition, the driving time can be alterable.

The embodiment shown in the figure has the air mixing hopper 51 at the material collection and supply part 50 on the molding machine side, so that the delay time of transporting and mixing t2 is relatively long. When an ordinary collection hopper is applied, the delay time t2 can be shortened. In addition, the embodiment can be executed without the delay time t1 and the delay time of transporting and mixing t2.

When the delay time of transporting and mixing t2 passes, namely the driving time of the transport blower 3a passes, the transport blower 3a is stopped. Next, when the material request signals are outputted from the material sensor 56, the transport blower 3a is driven and the valve body 15 of the discharge apparatus 10 is opened or closed, as mentioned above.

In this embodiment the valve body 15 is intermittently opened while a powdered or granular material is transported, the incorporating ratio of the material in the material transport pipe 2 (mixing ratio, ratio of mass flow of the material to that of the air flow in the pipe) is prevented from rapidly increasing and the material transport pipe 2 is not blocked up with the material, thereby achieving stable pneumatic transportation. The discharge apparatus 10 of the embodiment of the present invention as mentioned above prevents operation failure and damage caused by sticking of material, achieves smooth open or close operation, and enables quantitative discharge. Therefore, when the valve body 15 is designed to be intermittently opened, failure and damage caused by sticking of material can hardly occur and such a structure can be preferably applied.

The discharge and transport program executed in the transport system 1 for a powdered or granular material according to the embodiment of the present invention is not limited to the above-mentioned operation examples. The open position of the valve body 15 can be kept till predetermined time passes or fill-up signal or the like is outputted from the material sensor, without intermittently opening the valve body 15 as mentioned above. The storage part provided with the discharge apparatus 10 at the lower end is the drying hopper 30 in the transport system 1 for the material according to the embodiment of the present invention; however, this invention is not limited to such an embodiment. For example, the discharge apparatus 10 can be provided at the lower end of the storage part such as a material tank and a temporal storage hopper and the material in the storage part can be pneumatically transported to a transport destination like a drying hopper, a blending apparatus or a collection hopper on the molding machine. In addition, the material can be designed to fall by its own weight from the supply port 14a to be supplied to a supply destination, instead of an embodiment in which the discharge apparatus 10 of the embodiment of the present invention is incorporated to the transport system for pneumatically transporting the material.

In this embodiment of the present invention, the material discharge passage of the discharge apparatus 10 has the first discharge passage formed in a substantially vertical direction and connected at the lower end of the storage part, and the second discharge passage which is connected to the first discharge passage, is formed in an oblique downward direction, and has the material discharge port at the terminal end. However, the present invention is not limited to such an embodiment. For example, a material discharge passage comprising the above-mentioned first discharge passage and a second discharge passage connected to the first discharge passage and formed substantially horizontal can be provided. In such a case, the substantially horizontal second discharge passage can be designed short considering an angle of repose of the material so as to drop the material by its own weight. Or the material can be discharged from the discharge port by supplying compressed air from one end of the second discharge passage. Furthermore, the second discharge passage formed obliquely downward can be connected to the lower end of the storage part as a material discharge passage.

In the figure, the valve body 15, the discharge port 12a and the valve seat 13 of the discharge apparatus 10 are formed substantially circular; however, they can be formed like an ellipse, a rectangle, or other polygons.

The invention claimed is:

1. A discharge apparatus for a powdered or granular material provided at a lower end of a storage part in which a powdered or granular material is stored, said apparatus comprising:

a material discharge passage connected to said lower end of said storage part and provided with a material discharge port at a terminal end;

a valve body opening or closing said discharge port of said material discharge passage, and a valve driving part moving said valve body along a substantially orthogonal direction to a surface of a valve seat around said discharge port; wherein said material discharge passage comprises:

a first discharge passage provided substantially vertically and connected to said lower end of said storage part, and a second discharge passage provided obliquely downward, connected to said first discharge passage, and having said discharge port at the terminal end;

said valve seat is formed in a shape of a substantially vertical surface so as to face a horizontal direction around an entire circumference of said discharge port;

said valve body is constructed so as to move substantially horizontally to open or close said discharge port by said valve driving part, and to form a predetermined gap at a closed position between a surface, facing said valve seat, of a circumferential edge of said valve body and said surface of said valve seat along the circumferential direction of said discharge port, in which said gap is formed such that the powdered or granular material is not allowed to pass therethrough.

2. A transport system for the powdered or granular material, comprising:

a storage part for the powdered or granular material having said discharge apparatus as set forth in claim 1 at the lower end;

a material transport pipe for pneumatically transporting the powdered or granular material discharged from said discharge apparatus; and a control part for controlling said valve driving part of said discharge apparatus.

3. The transport system for the powdered or granular material as set forth in claim 2, said storage part is a drying hopper in which the powdered or granular material is dried by supplying heated gas thereinto.

4. The transport system for the powdered or granular material as set forth in claim 2, wherein said control part controls said valve driving part to intermittently open the valve body when the powdered or granular material in said storage part is discharged and pneumatically transported to a transporting destination based on material request signals from said destination connected to said material transport pipe.

5. The transport system for the powdered or granular material as set forth in claim 3, wherein said control part controls said valve driving part to intermittently open the valve body when the powdered or granular material in said storage part is discharged and pneumatically transported to a transporting destination based on material request signals from said destination connected to said material transport pipe.

* * * * *